US005573986A

United States Patent [19]
Talmy et al.

[11] Patent Number: 5,573,986
[45] Date of Patent: Nov. 12, 1996

[54] ELECTROMAGNETIC WINDOW

[75] Inventors: Inna G. Talmy, Silver Spring; Curtis A. Martin, Germantown, both of Md.; Deborah A. Haught, Sterling, Va.; Anh H. Le, Gaithersburg, Md.

[73] Assignee: The United States of America as represented by the Secretary of the Navy, Washington, D.C.

[21] Appl. No.: 615,658

[22] Filed: Mar. 13, 1996

Related U.S. Application Data

[63] Continuation of Ser. No. 387,548, Feb. 13, 1995, abandoned.

[51] Int. Cl.$^6$ ................................................. C04B 35/584
[52] U.S. Cl. .................... 501/97; 501/95; 501/103; 501/105
[58] Field of Search ................... 501/97, 95, 103, 501/105

[56] References Cited

U.S. PATENT DOCUMENTS

| | | | |
|---|---|---|---|
| 3,866,234 | 2/1975 | Gates, Jr. et al. | 343/911 |
| 4,046,581 | 9/1977 | Cassidy | 106/85 |
| 4,654,315 | 3/1987 | Hsieh | 501/98 |
| 4,677,443 | 6/1987 | Koetje et al. | 343/872 |
| 5,047,186 | 9/1991 | Huckabee et al. | 264/62 |
| 5,103,239 | 4/1992 | Verzemnieks et al. | 343/872 |
| 5,151,390 | 9/1992 | Aoki et al. | 501/95 |
| 5,371,050 | 12/1994 | Belitskus et al. | 501/95 |

OTHER PUBLICATIONS

I. G. Talmy, C. A. Martin, D. A. Haught. A. H. Le and Janovsky, "Development of Phosphate–Bonded Silicon Nitride Ceramics and Ceramic Matrix Composites," NSWC Technical Digest, pp. 16–25 (published Feb. 21, 1994).

I. G. Talmy, C. A. Martin, and D. A. Haught, "Building Materials Prepared from Phosphate–Bonded Fly Ash," NSWC Technical Digest pp. 26–27 (published Feb. 21, 1994).

Primary Examiner—Mark L. Bell
Assistant Examiner—Louis M. Troilo
Attorney, Agent, or Firm—John Forrest; Roger D. Johnson

[57] ABSTRACT

A ceramic electromagnetic window made of $Si_3N_4$ particles which are bonded together by a metal phosphate binder that is an $AlPO_4$ binder, a $ZrP_2O_7$ binder, or mixtures thereof, wherein the $Si_3N_4$ particles comprise from 55 to 85 volume percent of the ceramic material of the electromagnetic window with the metal phosphate binder comprising the remainder. By substituting $Si_3N_4$ whiskers for some of the $Si_3N_4$ particles a discontinuous fiber composite ceramic electromagnetic window is produced. The electromagnetic window may be a simple shape such as a flat or slightly curved sheet or a more complex shape such as a conical or spherical radome.

13 Claims, 1 Drawing Sheet

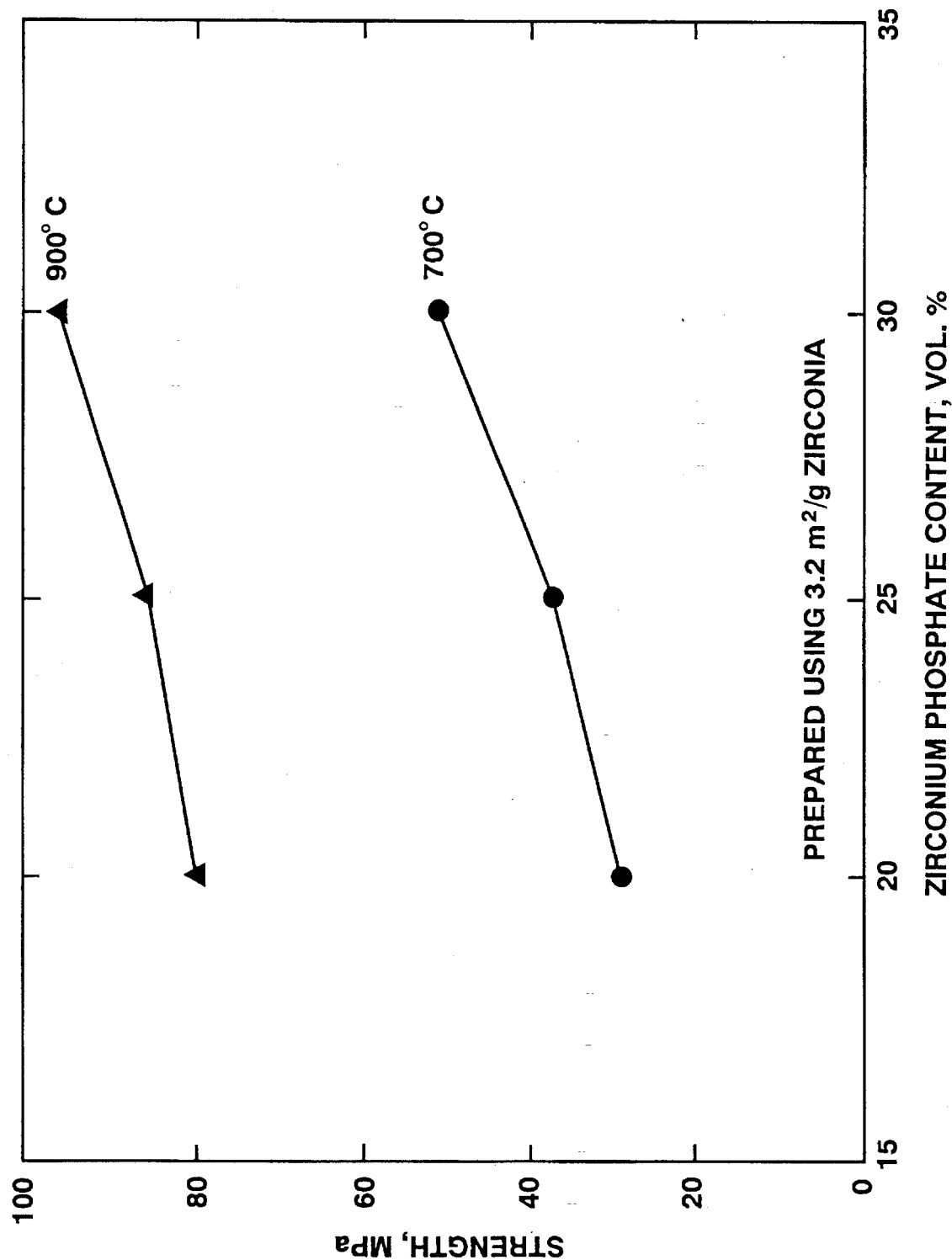

ELECTROMAGNETIC WINDOW

CROSS REFERENCE TO RELATED APPLICATION

The present application is a continuation of our application Ser. No. 08/387,548 filed Feb. 13, 1995, entitled "Electromagnetic Window," now abandoned.

BACKGROUND OF THE INVENTION

Future classes of advanced tactile missiles will require new ceramic materials for electromagnetic windows or radomes to meet stringent requirements arising from greater speeds and longer flight times. Such a ceramic material must have a high thermal stability, a low and thermally stable dielectric constant, a low coefficient of thermal expansion, resistance to high thermal shock, and resistance to erosion by rain.

Radome materials currently used are slip cast fused silica (SCFS) and Pyroceram 9606™ ($2MgO.2Al_2O_3.5SiO_2$, cordierite). While SCFS has excellent dielectric properties for radomes, the relatively low strength and rain erosion resistance of this material limits future application. Pyroceram 9606™ is more rain erosion resistant than SCFS, but is not as dielectrically stable with temperature.

Development of future electromagnetic window or radome materials is directed both toward improvement of the mechanical properties of SCFS and identification of new candidate ceramic materials. For example, materials in the system $Si_3N_4$—BN—$SiO_2$ (Nitroxyceram) have the potential of being nearly as good as SCFC dielectrically and at least as good if not better than Pyroceram 9606™ in erosion resistance. However, this material requires expensive processing techniques such as hot isostatic pressing.

It would be desirable therefore to provide new ceramic materials for electromagnetic windows or radomes which possess the desired physical properties but which are relatively inexpensive to produce.

SUMMARY OF THE INVENTION

Accordingly, an object of this invention is to provide radomes and other electromagnetic windows composed of new materials.

Another object of this invention is to provide radomes and other electromagnetic windows that are stronger and more resistant to rain erosion than presently used radomes.

A further object of this invention is to provide radomes and other electromagnetic windows having excellent dielectric properties.

Yet another object of this invention is to provide radomes and other electromagnetic windows having excellent thermal properties.

A still further object of this invention is to provide radomes and other electromagnetic windows having good particle impact resistances.

These and other objects of this invention are accomplished by providing an electromagnetic window (e.g., radome, etc.) made of ceramic material in which silicon nitride ($Si_3N_4$) particles are bonded together by a metal phosphate binder that is an aluminum phosphate ($AlPO_4$) binder, a zirconium phosphate ($ZrP_2O_7$) binder, or mixtures thereof.

The electromagnetic window is formed by die pressing or cold isostatic pressing (CIP) a mixture of the starting ingredients to form a green body and then firing the green body at a suitable temperature to produce the product electromagnetic window.

In a variation of the invention, $Si_3N_4$ whiskers are substituted for part of the $Si_3N_4$ powder (particles) and the same process is used to produce a discontinuous fiber ceramic composite electromagnetic window.

BRIEF DESCRIPTION OF THE DRAWING

The FIGURE is a graph of the flexural strength of zirconium phosphate bonded silicon nitride as a function of binder content and firing temperature and is discussed in the experimental section.

DESCRIPTION OF THE PREFERRED EMBODIMENT

The electromagnetic windows of the present invention are made of ceramic materials made of silicon nitride ($Si_3N_4$) particles which are bonded together by a suitable metal phosphate binder that is an aluminum orthophosphate ($AlPO_4$) binder, a zirconium phosphate ($ZrP_2O_7$) binder, or a mixture of these binders. The metal phosphate binder is produced from precursors which are mixed with the $Si_3N_4$ particles, formed into a green body of the desired shape and size, and then fired at temperature that converts the precursors into the metal phosphate binder. The electromagnetic windows may have simple shapes such as flat or curved planes (or sheets) or more complex shapes such as conical or spherical radomes.

The metal phosphate binder is preferably an aluminum orthophosphate ($AlPO_4$) binder, a zirconium phosphate ($ZrP_2O_7$) binder or a mixture of these two binders in any proportion. These binders produce ceramic composites which have good dielectric properties, strength, water resistance, and high temperature performance. $ZrP_2O_7$ binders are preferred because they produce ceramic composites with greater strength.

The metal phosphate binders can be produced from either of two types of precursors. First, the precursor may be metal phosphate hydrates which decompose during firing to produce the corresponding metal phosphate binder. Specifically, $AlPO_4$ hydrates decompose to produce $AlPO_4$ as a binder and $ZrP_2O_7$ hydrates decompose to produce $ZrP_2O_7$ as a binder. The second type of precursor comprises a mixture of orthophosphoric acid ($H_3PO_4$) and a metal oxide that is $Al_2O_3$, $ZrO_2$, or mixtures thereof which react during firing to produce the corresponding $AlPO_4$, $ZrP_2O_7$, or mixtures thereof as a binder. Note that the particle size of the $Al_2O_3$ powder is preferably less that 0.1 microns and more preferably about 0.05 microns to produce $AlPO_4$. The $Al_2O_3$ particle size is critical as demonstrated by 0.3 micron sized $Al_2O_3$ particles which produce aluminum metaphosphate, $(AlPO_3)_3$, at a firing temperature of 700° C. and a mixture of $Al(PO_3)_3$ and $AlPO_4$ at 900° C. Because $Al(PO_3)_3$ decomposes into $AlPO_4$ and $P_2O_5$ gas, it produces ceramic materials with poor strengths.

The $Si_3N_4$ particle size is not critical. Any $Si_3N_4$ particles which are suitable for the production of ceramic materials can be used to produce the electromagnetic windows (e.g., radomes, etc.) of this invention.

In the first step of the process, a mixture of the precursors for the metal phosphate binder is prepared. For an $AlPO_4$ binder a mixture of $AlPO_4$ hydrates and water or a mixture of 0.05μ $Al_2O_3$ particles and 85% $H_3PO_4$ can be used. For a $ZrP_2O_7$ binder a mixture of $ZrP_2O_7$ hydrates and water or a mixture of $ZrO_2$ particles and 85% $H_3PO_4$ can be used. The $Si_3N_4$ particles are then mixed into the precursor mixture in an amount that will produce a monolithic ceramic material with the desired volume percent of metal phosphate binder. Preferably the volume percent of metal phosphate ($AlPO_4$, $ZrP_2O_7$, or mixtures thereof) binder will be from 15 to 45, more preferably from 20 to 40, still more preferably from 25 to 35, and most preferably about 30 volume percent of the metal phosphate bonded $Si_3N_4$ monolithic ceramic material with the $Si_3N_4$ comprising the remainder. In other words, the $Si_3N_4$ particles comprise preferably from 55 to 85, more preferably from 60 to 80, still more preferably from 65 to 75, and most preferably about 70 volume percent of the metal phosphate bonded $Si_3N_4$ monolithic ceramic material with the metal phosphate binder comprising the remainder.

In the second step, the $Si_3N_4$ particle/metal phosphate binder precursor mixture is put into molds and pressed into green bodies of the size and shape of the ceramic electromagnetic windows to be produced. Simple shaped electromagnetic windows, such as flat or slightly curved planes, can be die pressed or cold isostatic pressed (CIP). More complex shaped electromagnetic windows, such as conical or spherical radomes, require CIP forming. Moreover, CIP is the more preferred pressing method because higher pressures can be used and stronger radomes can be produce. Wet bag CIP processes are particularly suitable for producing the radomes of this invention. Note if $AlPO_4$ hydrate or $ZrP_2O_7$ hydrate is used as the precursor, the moisture content of the $Si_3N_4$/precursor mixture may be too high for pressing. In that case, the mixture is dryed until the moisture content is suitable for pressing. A $Si_3N_4$/$Al_2O_3$/85%$H_3PO_4$ or $Si_3N_4$/$ZrO_2$/85%$H_3PO_4$ mixture formulated to produce about 40 or more volume percent of binder will be too plastic for die pressing and will be limited to CIP.

In the last step, the green body is fired in air or an inert atmosphere (e.g., nitrogen, argon, helium, etc.) or even in vacuum at a temperature of preferably from 700° C. to 900° C. and most preferably at about 900° C. to convert the precursors into the metal phosphate binder. As shown in the figure, firing at 900° C. produces a much stronger radome than firing at 700° C. Firing at temperatures above about 900° C. increases the cost of the process without significantly improving the radome.

The terms $AlPO_4$ phosphate binder and $ZrP_2O_7$ phosphate binder include more than the compounds $AlPO_4$ and $ZrP_2O_7$. The binders also include byproducts produced by the precursor reactions. For example, the firing of a $Si_3N_4$/$ZrO_2$/$H_3PO_4$ produces mostly $ZrP_2O_7$ but it also produces $Si_3(PO_4)_4$ from reaction between $H_3PO_4$ and $SiO_2$ on the surfaces of the $Si_3N_4$ particles and leaves some $ZrO_2$ unreactive. In this case, the term $ZrP_2O_7$ binder includes $ZrP_2O_7$, $ZrO_2$ and $Si_3(PO_4)$. The unreacted $ZrO_2$ functions as a good filler material. Because of the greater reactivity of $Al_2O_3$ with $H_3PO_4$ at lower temperatures much more of the $Al_2O_3$ forms $AlPO_4$. however, the term $AlPO_4$ binder still includes $AlPO_4$, $Al_2O_3$, and $Si_3(PO_4)_4$. Note, despite the lower reactivity of $ZrO_2$ with $H_3PO_4$, it still produces the strongest binder.

Discontinuous fiber ceramic composites are prepared by replacing a portion of the $Si_3N_4$ particles with $Si_3N_4$ whiskers. The same metal phosphate binders are used for the discontinuous fiber ceramic composites as were used in the monolithic ceramic composites: $AlPO_4$ binders, $ZrP_2O_7$ binders, or mixtures thereof. These binders are prepared from the same precursors as are used for the monolithic ceramic composites. The metal binders preferably comprise from 20 to 40, more preferably from 24 to 35, and most preferably about 30 volume percent of the discontinuous fiber ceramic composite. The $Si_3N_4$ whiskers comprise preferably from more than zero to 40, more preferably from 10 to 40 still more preferably about 25 to 35 volume percent of the discontinuous fiber ceramic composite. The $Si_3N_4$ particles comprise the remainder of the discontinuous fiber ceramic composite. The mixing, pressing, and firing steps used to prepare the discontinuous fiber ceramic composite are the same as those used to prepare the monolithic ceramic composite.

The general nature of the invention having been set forth, the following examples are presented as a specific illustrations thereof. It will be understood that the invention is not limited to these specific examples but is susceptible to various modifications that will be recognized by one of ordinary skill in the art.

EXPERIMENTAL

Silicon nitride ceramics were prepared using aluminum and zirconium phosphate binders. Silicon nitride powder of 97.8% purity (2% oxygen), 90% alpha phase, and particle size 0.7 μm was used in this study. The phosphate phases were formed in the materials as a result of the reaction of aluminum oxide and zirconium oxide with phosphoric acid. The powders used in the experiments were 0.05 μm alumina (mixed gamma and alpha phases) and zirconia (3.2 and 22 $m^2$/g surface area). The phosphoric acid ($H_3PO_4$ was 85 wt. % concentration, 99.99% purity.

Starting materials were combined in proportions to form 20–30 vol. % $AlPO_4$ and $ZrP_2O_7$ in $Si_3N_4$ ceramic during firing. Each batch was mixed by first combining the $Al_2O_3$ or $ZrO_2$ with $H_3PO_4$ and then adding $Si_3N_4$. All raw mixtures were sieved through a 500 μm screen. Specimens of size 5×5×60 mm were pressed at 50–100 MPa in a steel die and fired at temperatures up to 900° C. in air.

The flexural strength of zirconium phosphate bonded silicon nitride is shown in FIG. 1 as a function of binder content and firing temperature. Strength of the ceramics increased with increasing binder content and firing temperature, with the highest strength of 96 MPa observed for specimens containing 30 vol. % $ZrP_2O_7$ and fired at 900° C. X-ray diffraction shows that the materials contained $ZrP_2O_7$ as well as a significant amount of unreacted zirconium oxide (baddeleyite). The use of higher surface area zirconia (22 instead of 3.2 $m^2$/g) promoted the reaction between $ZrO_2$ and $H_3PO_4$, although the ceramics still contained some unreacted zirconia. However, the strength of ceramics based on the higher surface area $ZrO_2$ was lower compared to strength for those based on 3.2 $m^2$/g zirconia, presumably due to the poor packing of the finer zirconia. The significant increase in strength of high surface area $ZrO_2$ based materials after isostatic pressing is further evidence of the poor packing.

The results of dielectric property measurements on $AlPO_4$ and $ZrP_2O_7$ bonded silicon nitride are shown in Table 1. The room temperature dielectric constant of all materials was below 5, and the percent change to 1000° C. was below 7%; the loss tangent of all materials was below 0.006. These dielectric properties make phosphate bonded silicon nitride materials promising candidates for advanced radome applications.

TABLE 1

Dielectric constant and Loss Tangent of phosphate Bonded Silicon Nitride

| Specimen Composition $Si_3N_4+$ | Dielectric Constant 20° C. | % change to 1000° C. | Loss Tangent |
|---|---|---|---|
| 30% $AlPO_4$ | 4.03 | 5.2 | 0.0055 |
| 30% $AlPO_4$/30% $Si_3N_4$ whiskers | 4.17 | 5.35 | 0.0050 |
| 30% $ZrP_2O_7$ | 4.98 | 6.5 | 0.0031 |
| Radome Requirements | <9 | <7 | <0.1 |

Table 2 shows the changes in weight and dimensions of ceramic materials made of $Si_3N_4$ particles with (a) 25 volume percent $ZrP_2O_7$ binder and with (b) 30 volume percent $AlPO_4$ binder after 5 minute exposure to temperatures from 1000° to 1400° C. Thermal exposure time and temperatures were chosen to simulate a possible service environment of tactical missile radomes. Zirconium phosphate bonded specimens experienced expansion beginning at 1150° C., which increased to 17.7% at 1200° C. This expansion was accompanied by a weight loss, which was significant over 1300° C. The weight losses and expansion (bloating) of the specimens can be attributed to the combined effect of decomposition of silicon phosphate and oxidation of silicon nitride. Aluminum phosphate bonded specimens, on the other hand, experienced a much smaller weight loss and expansion. It is assumed that aluminum phosphate bonded silicon nitride contains a smaller amount of silicon phosphate. Alumina reacts with phosphoric acid at 100° C., compared to 250° C. for zirconia, therefore decreasing the amount of phosphoric acid which could react with the silica from silicon nitride. The smaller expansion at temperatures about 1300° C. is due to partial sintering at these temperatures. No significant changes in phase composition were observed for either material at any temperature, aside from the partial transformation of residual monoclinic zirconia to the tetragonal phase.

TABLE 2

Weight and Dimensional Changes of Zr- and Al-Phosphate Bonded $Si_3N_4$ Ceramics After 5 Minute Thermal Exposures

| Temperature (°C.) | Zr Phosphate | | Al Phosphate | |
|---|---|---|---|---|
| | Weight Change (%) | Linear Change (%) | Weight Change (%) | Linear Change (%) |
| 1000 | −0.2 | 0 | — | — |
| 1100 | −0.15 | 0 | — | — |
| 1150 | +0.2 | +2.2 | — | — |
| 1200 | −0.27 | +17.7 | −0.1 | 0 |
| 1300 | −4.1 | +15.9 | −1.1 | +4.3 |
| 1400 | −5.7 | +13.3 | −2.8 | +1.8 |

A $Si_3N_4$ whisker reinforced composite of 30 volume percent $AlPO_4$ binder, 30 volume percent of $Si_3N_4$ whiskers (grade SNW1-S from American Matrix), and 40 volume percent of $Si_3N_4$ particles was prepared. For comparison a control sample monolithic ceramic material was made from 30 volume percent $AlPO_4$ binder and 70 volume percent of $Si_3N_4$ particles. Compositions were mixed using a centrifugal ball mill using a rubber coated steel media. Dry ingredients were mixed first, followed by addition of 85% $H_3PO_4$ and further mixing. Disc-shaped specimens were die pressed at 10 MPa followed by isopressing at 350 MPa, and fired at 700° C. in air. After firing, all specimens were sectioned into bars, ground, and polished to 6 microns. The introduction of $Si_3N_4$ whiskers resulted in a decrease in strength in the composite. The monolithic composite control sample (30% $AlPO_4$/70% $Si_3N_4$ particles) had a flexural strength of 85.0 MPa and an open porosity of 18.0% while the discontinuous $Si_3N_4$ whisker composite (30% $AlPO_4$/30% $Si_3N_4$ whiskers/ 40% $Si_3N_4$ particles) had a flexural strength of 47.9 MPa and an open porosity of 20.0%. The discontinuous $Si_3N_4$ has excellent dielectric properties as shown in table 1.

Obviously, other modifications and variations of the present invention may be possible in light of the foregoing teachings. It is therefore to be understood that within the scope of the appended claims the invention may be practiced otherwise than as specifically described.

What is claimed is:

1. A ceramic electromagnetic window comprising $Si_3N_4$ particles which are bonded together by a metal phosphate binder that is an $AlPO_4$ binder, a $ZrP_2O_7$ binder, or mixtures thereof, wherein the $Si_3N_4$ particles comprise from 55 to 85 volume percent of the ceramic material of the electromagnetic window with the metal phosphate binder comprising the remainder.

2. The electromagnetic window of claim 1 wherein the $Si_3N_4$ particles comprise from 60 to 80 volume percent of the ceramic material.

3. The electromagnetic window of claim 2 wherein the $Si_3N_4$ particles comprise from 65 to 75 volume percent of the ceramic material.

4. The electromagnetic window of claim 1 wherein the metal phosphate binder is an $AlPO_4$ binder.

5. The electromagnetic window of claim 1 wherein the metal phosphate binder is a $ZrP_2O_7$ binder.

6. An electromagnetic window comprising a ceramic composite comprising:

A. from 20 to 40 volume percent of a metal phosphate binder that is an $AlPO_4$ binder, a $ZrP_2O_7$ binder, or mixtures thereof;

B. from more than zero to 40 volume percent of $Si_3N_4$ whiskers; and

C. the remainder of the ceramic composite of the ceramic composite being $Si_3N_4$ powder.

7. The electromagnetic window of claim 6 wherein the metal phosphate binder comprises from 25 to 35 volume percent of the ceramic composite.

8. The electromagnetic window of claim 7 wherein the metal phosphate binder comprises about 30 volume percent of the ceramic composite.

9. The electromagnetic window of claim 6 wherein the metal phosphate binder is an $AlPO_4$ binder.

10. The electromagnetic window of claim 6 wherein the metal phosphate binder is a $ZrP_2O_7$ binder.

11. The electromagnetic window of claim 6 wherein the $Si_3N_4$ whiskers comprise from 10 to 40 volume percent of the ceramic composite.

12. The electromagnetic window of claim 11 wherein the $Si_3N_4$ whiskers comprise from 20 to 40 volume percent of the ceramic composite.

13. The electromagnetic window of claim 12 wherein the $Si_3N_4$ whiskers comprise from 25 to 35 volume percent of the ceramic composite.

* * * * *